United States Patent
Jeon

(10) Patent No.: US 10,663,310 B2
(45) Date of Patent: May 26, 2020

(54) SYSTEM AND METHOD FOR MANAGING EXCEPTIONAL DESTINATION IN GEO-FENCE

(71) Applicants: Hyundai Motor Company, Seoul (KR); Kia Motors Corporation, Seoul (KR)

(72) Inventor: Young-Tak Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/210,687

(22) Filed: Dec. 5, 2018

(65) Prior Publication Data

US 2020/0025582 A1 Jan. 23, 2020

(30) Foreign Application Priority Data

Jul. 13, 2018 (KR) .................. 10-2018-0081776

(51) Int. Cl.
*G01C 21/34* (2006.01)
*H04W 84/20* (2009.01)
*H04W 4/021* (2018.01)

(52) U.S. Cl.
CPC ..... *G01C 21/3461* (2013.01); *G01C 21/3415* (2013.01); *H04W 4/021* (2013.01); *H04W 84/20* (2013.01)

(58) Field of Classification Search
CPC ......... H04W 4/021; H04W 4/04; H04W 4/40; H04W 4/48
See application file for complete search history.

(56) References Cited

U.S. PATENT DOCUMENTS

| | | | |
|---|---|---|---|
| 2010/0082245 A1* | 4/2010 | Patenaude | G01C 21/26 701/533 |
| 2011/0102189 A1* | 5/2011 | Murray | B60R 25/04 340/870.07 |
| 2014/0303837 A1* | 10/2014 | Tuukkanen | G06Q 10/02 701/36 |
| 2015/0288677 A1* | 10/2015 | Chun | H04L 63/102 726/5 |

(Continued)

FOREIGN PATENT DOCUMENTS

| | | |
|---|---|---|
| JP | 2010-256272 A | 11/2010 |
| KR | 20160080588 A | 7/2016 |

(Continued)

*Primary Examiner* — Marisol Figueroa
(74) *Attorney, Agent, or Firm* — Mintz Levin Cohn Ferris Glovsky and Popeo, P.C.; Peter F. Corless

(57) ABSTRACT

A system for managing a geo-fence of a vehicle may include a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination.

25 Claims, 8 Drawing Sheets

(56) References Cited

U.S. PATENT DOCUMENTS

2017/0023367 A1\* 1/2017 Jin ..................... G01C 21/3453
2017/0199046 A1\* 7/2017 Lee ..................... G01C 21/3415
2019/0164247 A1\* 5/2019 Frischmuth .......... G06Q 10/047

FOREIGN PATENT DOCUMENTS

KR       20170084547 A     7/2017
KR       20180068733 A     6/2018

\* cited by examiner

SYSTEM AND METHOD FOR MANAGING EXCEPTIONAL DESTINATION IN GEO-FENCE

CROSS-REFERENCE TO RELATED APPLICATION

This application claims the benefit of priority to Korean Patent Application No. 10-2018-0081776, filed on Jul. 13, 2018 in the Korean Intellectual Property Office, the disclosure of which is incorporated herein by reference in its entirety.

BACKGROUND OF THE DISCLOSURE

Field of the Disclosure

The present disclosure relates to a geo-fence for a vehicle that allows the vehicle to be operated only in a certain area, and more particularly, to a system and a method for managing an exceptional destination in a geo-fence that temporarily approves a destination outside a geo-fence.

Description of Related Art

A geo-fence refers to a virtually set geographical area. Various modern position-based services utilize geo-fence technology.

One environment in which the geo-fence technology can be utilized is a vehicle. For example, a geo-fence can be applied in a vehicular environment such that the vehicle can travel only within the area set by the geo-fence. A terminal installed in the vehicle and/or a server wirelessly connected to the terminal can monitor the position of the vehicle, and if the vehicle travels outside the geo-fence, the terminal and/or server can generate an alert. In one example, a telematics server confirms the position of the vehicle in real-time using a Global Positioning System (GPS), etc., and monitors whether or not the vehicle is traveling outside the geo-fence (set by an authorized person).

As described above, the vehicle can be controlled to restrict travel only within a predetermined area by adapting geo-fence technology. However, it can sometimes be necessary for the vehicle to travel the outside of the geo-fence.

In such a case, if a driver of the vehicle intends to visit a hospital located outside the geo-fence, for example, an audio-video-navigation (AVN) terminal installed in the vehicle, and/or a server connected to the AVN terminal, may activate a departure warning alarm upon the vehicle leaving the geo-fence, even though circumstances require the driver to travel outside of the geo-fence. Problematically, conventional geo-fence technology does not recognize certain destinations located outside the geo-fence as exceptions to the regular geo-fence restrictions. Thus, when the vehicle inevitably travels to an "exceptional" destination outside the geo-fence, the driver is discomforted due to the departure warning alarm of the geo-fence. In addition, the server, which monitors the location of the vehicle, may process the signal that the vehicle has left the geo-fence, increasing the amount of information to be processed.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to solve the above problem. An object of the present disclosure is to provide a system and a method for managing an "exceptional" destination of a geo-fence (i.e., a destination which represents an exception to the regular geo-fence rules), which temporarily processes an exception for the destination outside a geo-fence, thus preventing generation of a departure warning alarm when the vehicle leaves the geo-fence.

According to embodiments of the present disclosure, destination system for managing a geo-fence of a vehicle may include a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination.

Furthermore, in accordance with embodiments of the present disclosure, a method for managing a geo-fence of a vehicle may include: receiving, by a terminal equipped in the vehicle, a destination to which a user intends to travel; determining, by the terminal, whether the destination is located outside of a previously established geo-fence stored in the terminal, the geo-fence defining an area in which traveling of the vehicle is approved; generating, by the terminal, an alarm indicating that the vehicle has left the geo-fence when the vehicle leaves the geo-fence; requesting, by the terminal, approval for designating a destination outside of the geo-fence as an exceptional destination from a master device operated by a person authorized to set the geo-fence; receiving, by the master device, the request from the terminal; generating, by the master device, the approval for designating the destination as an exceptional destination in response to the request; and preventing, by the terminal, the generation of the alarm when the vehicle leaves the geo-fence while traveling to the destination.

According to the system and method for managing a geo-fence in accordance with embodiments of the present disclosure, when the authorized person who sets the geo-fence approves the "exceptional destination" (i.e., a destination for which the regular geo-fence restrictions do not apply) requested by the driver, it is unnecessary to generate an alarm indicating that the vehicle has left the geo-fence while the vehicle is traveling to the exceptional destination or returns from the exceptional destination.

As a result, it is possible to prevent unnecessary alarms while traveling in the vehicle, thus eliminating discomfort caused by the geo-fence departure alarm.

In addition, the server does not need to take a separate action for processing the signal that the vehicle has left the geo-fence, reducing the amount of information to be processed by the server.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1:
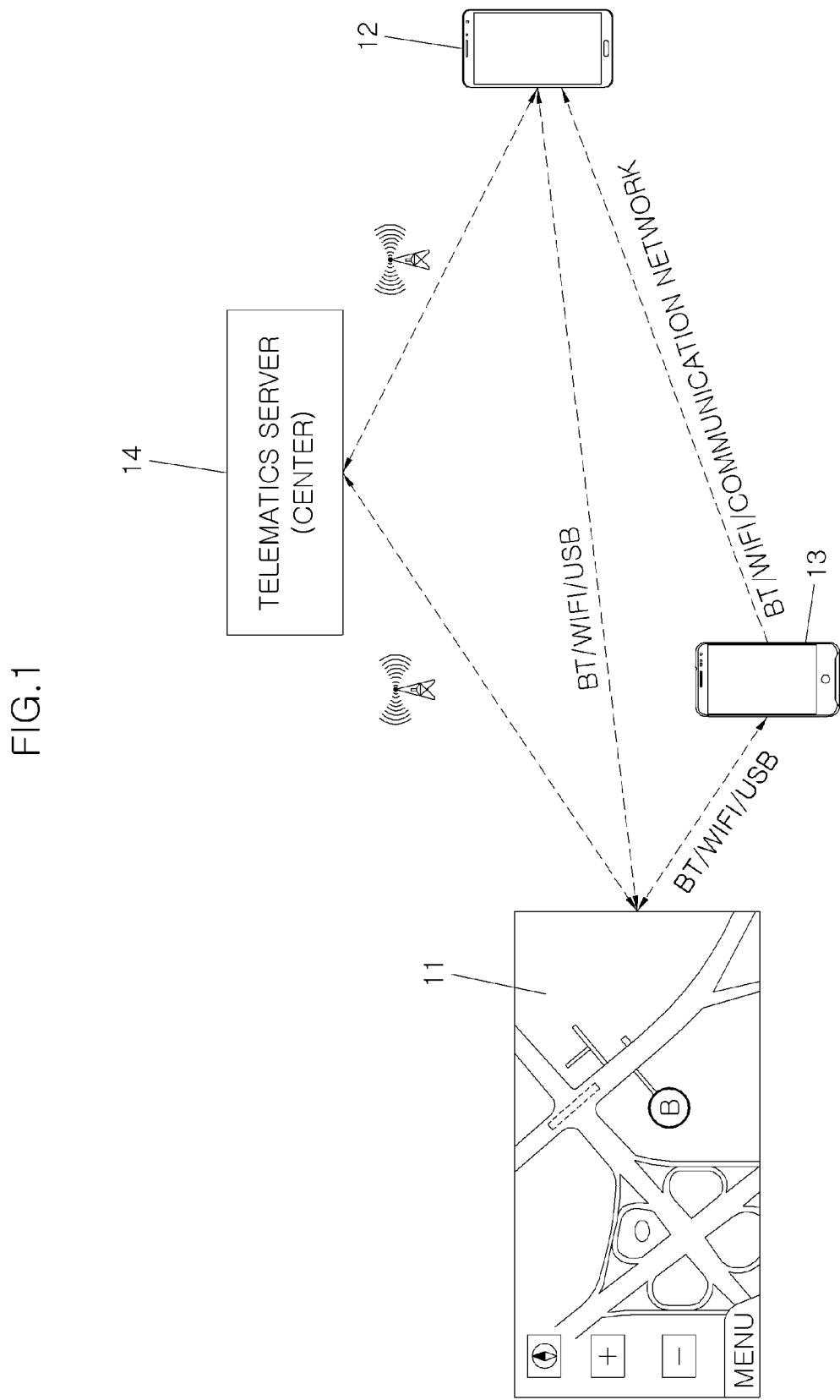
FIG. 1 is a schematic diagram illustrating a system for managing an exceptional destination in a geo-fence in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF SPECIFIC EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a system and a method for managing an exceptional destination in a geo-fence in accordance with embodiments of the present disclosure will be described in detail with reference to the accompanying drawings.

A system for managing an exceptional destination in a geo-fence in accordance with embodiments of the present disclosure determines whether or not a current position A of a vehicle or a destination B input to the vehicle is located outside a geo-fence G which defines an area within which the traveling of the vehicle has been previously approved; and in a geo-fence system in which an alarm is generated when the vehicle leaves the geo-fence G, the geo-fence system includes a terminal that requests an approval for the destination B as an "exceptional destination" (i.e., an exception to the regular geo-fence restrictions, or a destination for which the regular geo-fence restrictions do not apply), and thereby prevents generation of the alarm when the vehicle leaves the geo-fence G. That is, when the destination B is approved as the "exceptional destination," the alarm indicating that the vehicle has left the geo-fence G is prevented, even if the vehicle leaves the geo-fence G, while the vehicle travels to the destination B.

The terminal is installed in the vehicle to guide a driver along a route to a destination, and to generate an alarm when the vehicle leaves the geo-fence G.

In the present disclosure, the terminal alarms the departure of the vehicle when the vehicle travels to the destination set by the user (e.g., a driver or passenger) outside the geo-fence G.

As an example of the terminal, it can be an AVN 11 mounted in the vehicle. The Audio, Video, Navigation (AVN) is a device for the vehicle that is implemented in one terminal by integrating a navigation for guiding the driver along a route to a destination, and audio and video functions of the vehicle.

The AVN 11 can receive the destination B from the user, guide the driver along a route to the destination input by the user, and determine whether or not the destination B is located inside or outside the geo-fence G.

In addition, the AVN 11 asks the user whether or not to request an approval for the destination B as the exceptional destination when the input destination B is located outside the geo-fence G, and requests the approval for the destination B as the exceptional destination when the user agrees it.

The geo-fence G becomes a virtual geographical area inside which it has been previously approved for the vehicle to travel. When the vehicle leaves the geo-fence G, the AVN 11 generates an alarm indicating that the vehicle has left the geo-fence G through a screen, a speaker, etc. of the AVN 11.

Meanwhile, it is natural that the terminal can directly communicate with a master device, or can also communicate with the master device through the telematics server or the slave device.

The telematics server is a series of information delivery media between an in-vehicle terminal and a telematics center, and transmits a request for the approval for the exceptional destination received from the terminal together with additional information such as the current position of the vehicle, the destination, the route to the destination, and the expected arrival time.

In this time, the route to the destination, the expected arrival time, etc. can be information generated in the terminal, or information generated in the telematics server. Preferably, the telematics server 14 generates the route to the destination and the expected arrival time.

When the telematics service is not supported, a smart phone with an application capable of searching for exceptional destination information can be substituted with a slave device 13. The slave device 13 preferably transmits not only the searched destination information but also the additional information such as the current position of the vehicle, the route, and the expected arrival time together. Particularly, it is preferable to be the same as the additional information transmitted to the master device 12 through the telematics server, and at least the slave device 13 transmits the searched destination information to the master device 12.

The AVN 11 supports wireless communication and wired communication, and when the AVN 11 supports the telematics service, remote wireless communication using the communication networks of mobile carriers as well as near-field wireless communication are possible. In addition, the AVN 11 can also directly perform remote wireless communication with the master device 12 or the slave device 13, which will be described later. In addition, as in the case where the authorized person who sets the geo-fence is aboard the vehicle, when the AVN 11 and the master device 12 or the slave device 13 are located adjacent to each other, the near-field wireless communication can be used. Meanwhile, when the AVN 11 does not support the telematics service, only the near-field wireless communication is supported.

The wired communication can be a Universal Serial Bus (USB) through a cable.

The near-field wireless communication can be Wi-Fi, Bluetooth, etc. The near-field wireless communication can allow wireless communication between the AVN 11 and the slave device 13 carried by the driver, or can allow wireless communication therebetween even when the AVN 11 and the master device 12 are adjacent to each other.

The terminal can be also a navigation device that does not support a multimedia function and only performs route guidance. Even if the terminal is applied as the navigation, it communicates with the master device 12, the slave device 13, and the telematics server 14 by wireless communication.

When the AVN 11 does not support the telematics service, the slave device 13 searches for the exceptional destination, requests an approval for the exceptional destination from the master device 12 by the wireless communication function of the slave device 13, and receives the result thereof.

Meanwhile, when the slave device 13 requests the approval for the exceptional destination, the destination information searched from the slave device 13 is transmitted to the AVN 11 through USB, Wi-Fi, Bluetooth, etc.

The master device 12 is operated by the authorized person who sets the geo-fence, and sets various authorities for the operation of the geo-fence G.

The master device 12 receives the current position of the vehicle, the route during traveling, etc. from the AVN 11 through the communication with the AVN 11, and monitors whether or not the vehicle is located in the geo-fence G. The master device 12 can alarm so that the authorized person who sets the geo-fence can recognize it when the vehicle is located outside the geo-fence G.

Particularly, the master device 12 communicates with the AVN 11 to receive the request for the approval for the exceptional destination input by the user from the AVN 11, and transmits the result as to whether or not the authorized person who sets the geo-fence has approved the destination B as the exceptional destination to the AVN 11.

The master device 12 can set the destination B as the exceptional destination to which the vehicle may travel for a predetermined number of times or a predetermined duration of time, or the master device 12 can set the destination B as the exceptional destination until its designation as an exceptional destination is reversed. That is, upon approving the exceptional destination, the master device 12 can approve to travel outside the geo-fence by a predetermined number of times when traveling to the exceptional destination. In addition, upon approving the exceptional destination, the master device 12 can approve to travel outside the geo-fence for a predetermined duration of time when traveling to the exceptional destination. For example, it is possible to set the expected time, within which the vehicle should arrive, from the moment that the vehicle leaves the geo-fence G to the exceptional destination, or upon approving the exceptional destination, to restrict the time outside of the geo-fence G so that the vehicle must re-enter the geo-fence G, after arriving at the exceptional destination, within a predetermined duration of time. Meanwhile, the exceptional destination once set by the master device 12 can continuously become the exceptional destination until the designation of the destination as an exceptional destination is reversed.

The master device 12 can be a smartphone, for example.

The slave device 13 is located in the vehicle, and when the AVN 11 does not support the telematics service, performs the near-field wireless communication or the wired communication with the AVN 11 and communicates with the master device 12 through the remote wireless communication.

The slave device 13 performs the near-field wireless communication such as Wi-Fi and Bluetooth with the AVN 11, or performs the wired communication through the USB cable.

When the AVN 11 does not directly request the approval for the destination B input to the AVN 11 as the exceptional destination from the telematics server 14 or the master device 12, the AVN 11 requests the approval for the exceptional destination through the slave device 13, and the approved result is also transmitted from the master device 12 to the AVN 11 through the slave device 13.

For example, the slave device 13 can be a smart phone carried by the user rather than the authorized person who sets the geo-fence.

The telematics server 14 connects the AVN 11 and the master device 12 to each other. When the AVN 11 supports the telematics service, the master device 12 and the slave device 13 perform the remote wireless communication through the telematics server 14, and when the approval for the exceptional destination is requested from the AVN 11, the telematics server 14 transmits it to the master device 12, and when the master device 12 determines whether or not the exceptional destination is approved, the telematics server 14 transmits it to the AVN 11.

When the approval for the exceptional destination is requested from the AVN 11 to the master device 12, the telematics server 14 transmits the additional information such as the current position of the vehicle, the route to the destination, and the expected arrival time together thereto. The additional information such as the route to the destination and the expected arrival time is preferably generated in the telematics server 14.

Figure 7:
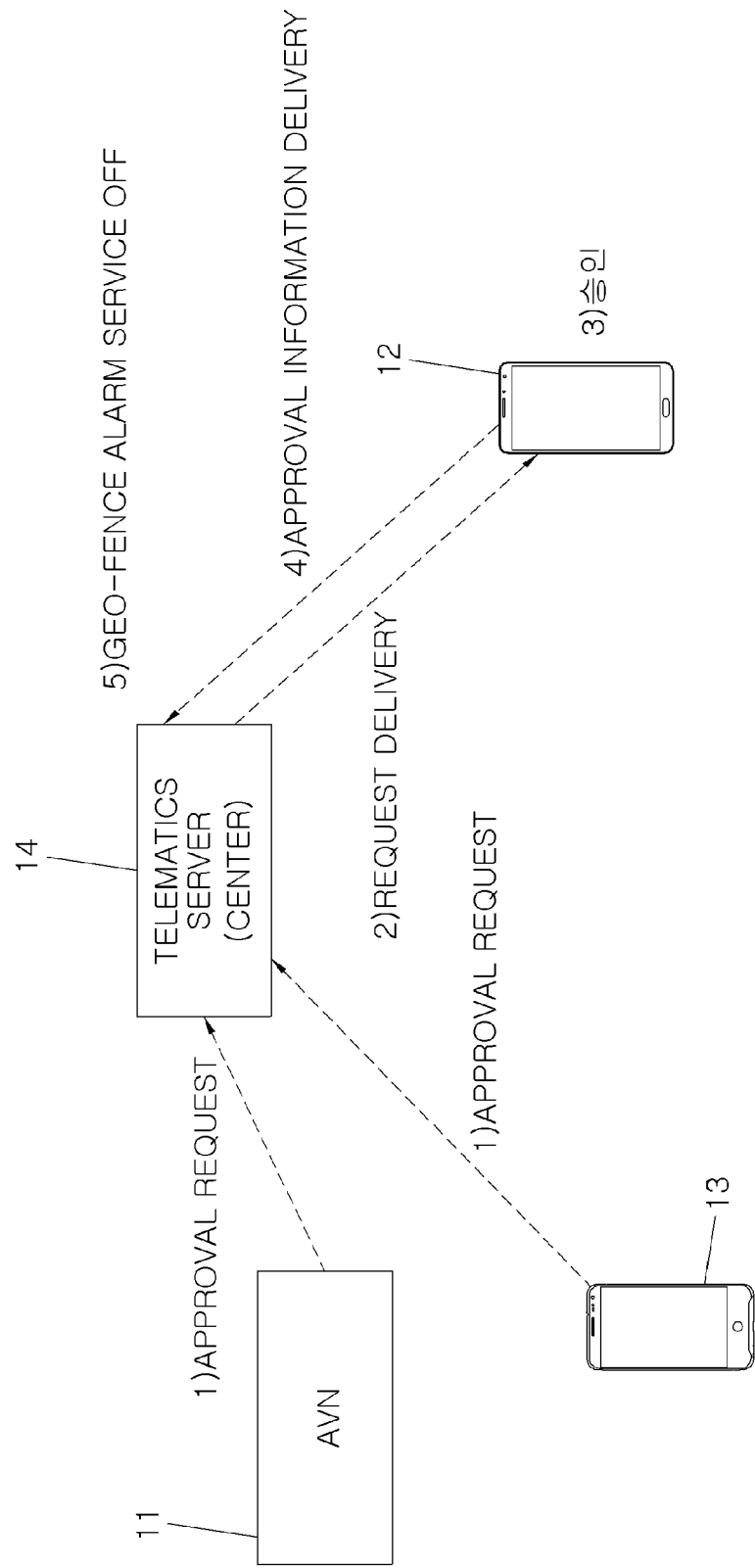
FIG. 7 is a schematic diagram illustrating the state where the terminal or the slave device in the vehicle requests the temporary deactivation of the geo-fence, and when approved, the telematics server turns off a geo-fence alarm service for the exceptional destination in a system for managing an exceptional destination in a geo-fence in accordance with embodiments of the present disclosure.

FIG. 7 illustrates another system for managing an exceptional destination in a geo-fence in accordance with embodiments of the present disclosure.

The AVN 11 that is a terminal installed in the vehicle and the slave device 13 are configured as one unit, and the AVN 11 or the slave device 13 requests the temporary deactivation of the geo-fence through the telematics server 14 from the master device 12.

The user operates any one of the AVN 11 and the slave device 13 to request the temporary deactivation of the set geo-fence, that is, the temporary deactivation of the restricted traveling area of the vehicle.

When the requests for the temporary deactivation for the geo-fence from the AVN 11 and the slave device 13 are delivered to the master device 12 through the telematics server 14, the master device 12 approves or rejects the temporary deactivation of the geo-fence, and transmits the result to the telematics server 14.

As described above, when the temporary deactivation of the geo-fence G is approved, it is not monitored whether or not the vehicle leaves the geo-fence G any more even if the vehicle travels outside the geo-fence.

In the above-described embodiment, the alarm for the departure of the geo-fence has been stopped when traveling to a specific destination, that is, the exceptional destination, but in this embodiment, even if the vehicle travels outside the geo-fence G even without specifying the destination, the alarm for the departure of the geo-fence is not performed.

Figure 8:
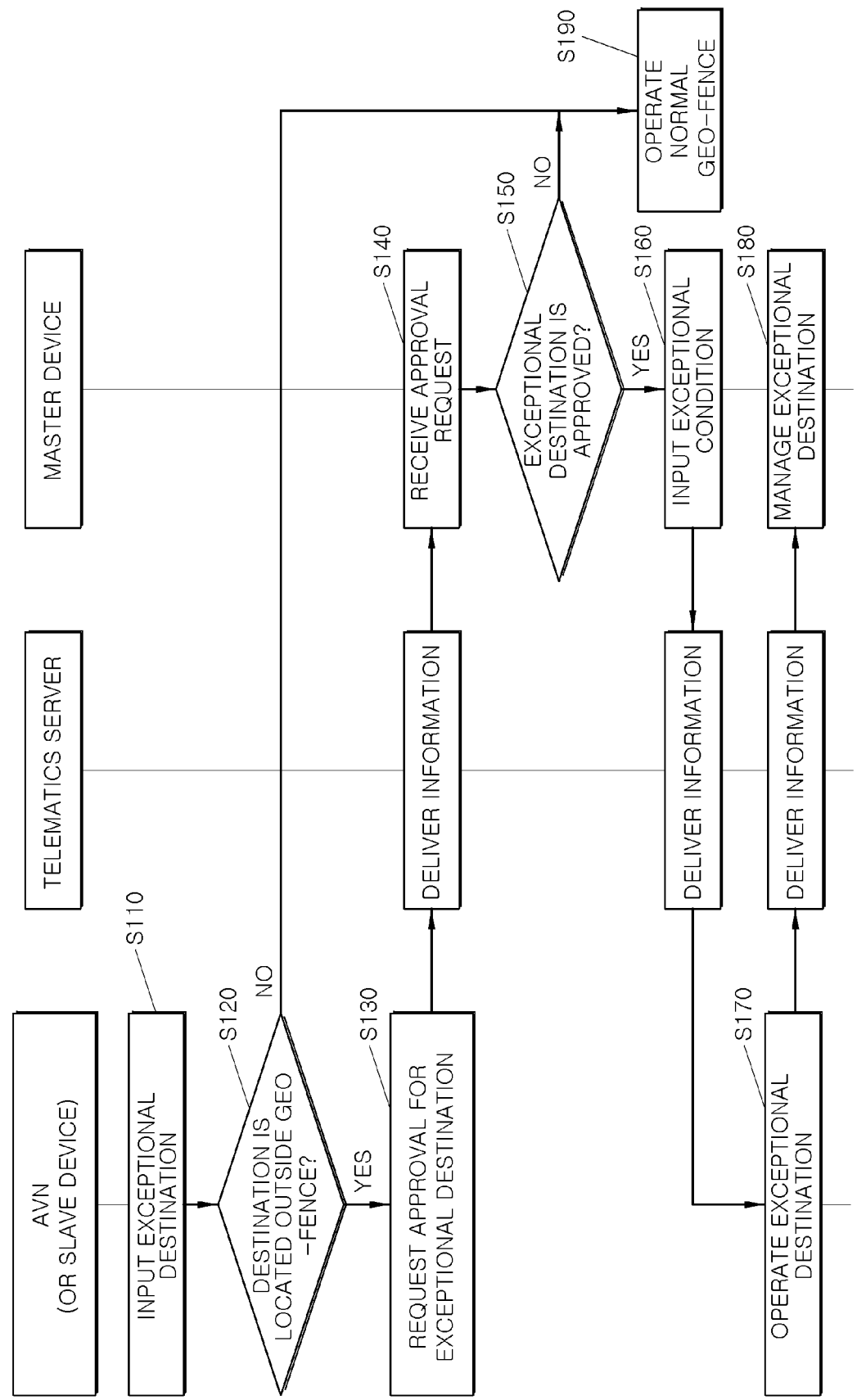
FIG. 8 is a flowchart illustrating the method for managing the exceptional destination in the geo-fence in accordance with embodiments of the present disclosure.

Meanwhile, a method for managing an exceptional destination in a geo-fence in accordance with embodiments of the present disclosure will be described with reference to FIG. 8.

A method for managing an exceptional destination in a geo-fence in accordance with embodiments of the present disclosure includes inputting a destination B, to which the user intends to travel the vehicle, into the terminal located in a vehicle S110, determining whether or not the destination B is located outside a predetermined geo-fence G by the terminal S120, requesting an approval for the destination B as an exceptional destination that does not alarm even if the vehicle leaves the geo-fence G from the master device 12 having the authority setting the geo-fence of the vehicle by the terminal S130, receiving the request for the approval for the exceptional destination of the terminal by the master device 12 S140, determining whether or not to set the destination B as the exceptional destination by the master device 12 S150, and traveling the exceptional destination that does not alarm that the vehicle has left the geo-fence G while the vehicle travels from the geo-fence G to the exceptional destination or travels from the exceptional destination into the geo-fence G while guiding the vehicle to the destination B when the destination B is approved as the exceptional destination by the terminal S170.

The inputting the destination S110 is for a user who does not have the authority to set the geo-fence to input the destination B to which the vehicle intends to travel into the terminal located in the vehicle.

In inputting the destination S110, the user can use the terminal mounted in the vehicle, for example, an Audio, Video, Navigation (AVN) terminal. Alternatively, it can use the terminal carried by the user, for example, the slave device 13 having no authority function to set the geo-fence.

The determining the destination position S120 determines whether or not the destination B input by the user is located inside or outside the geo-fence G in which the vehicle is set to be travelable.

Figure 2:
FIG. 2 is a screen illustrating an example setting a destination outside the geo-fence at a current position in the geo-fence in the system and method for managing the exceptional destination in the geo-fence in accordance with embodiments of the present disclosure.
Figure 3:
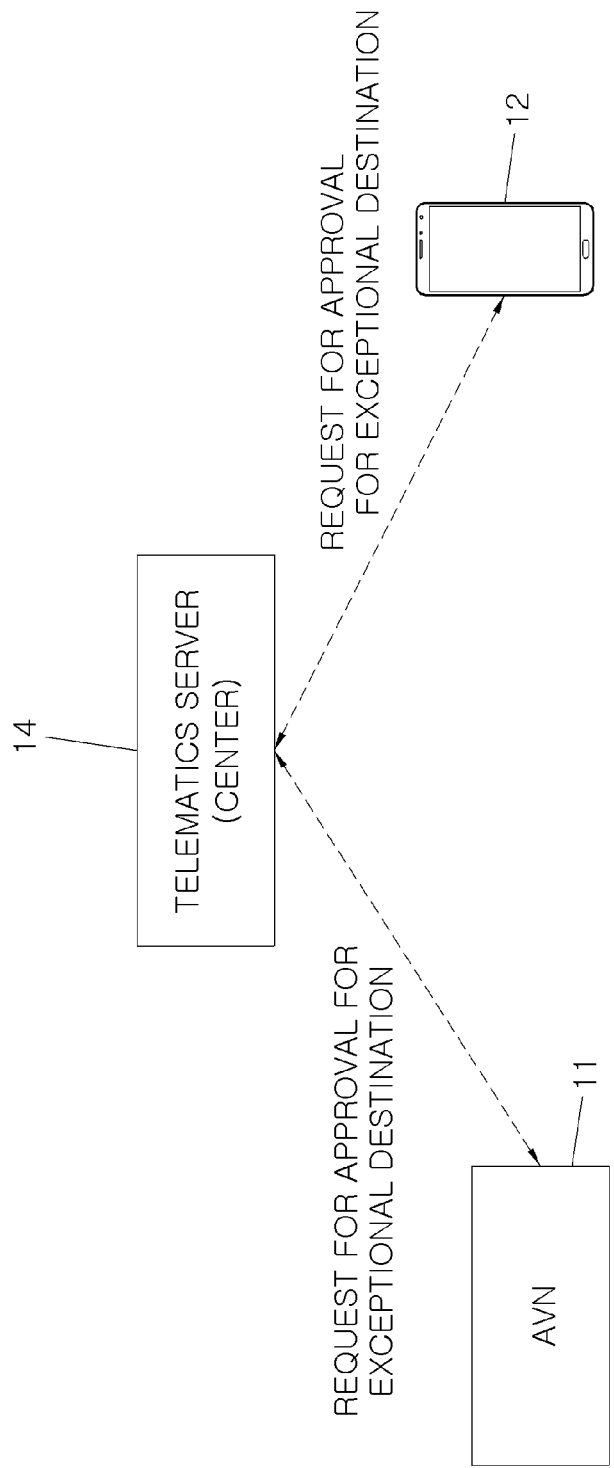
FIG. 3 is a schematic diagram illustrating a procedure in which an AVN requests an approval for the exceptional destination from a master device through a telematics server in the system and method for managing the exceptional destination in the geo-fence in accordance with embodiments of the present disclosure.
Figure 4:
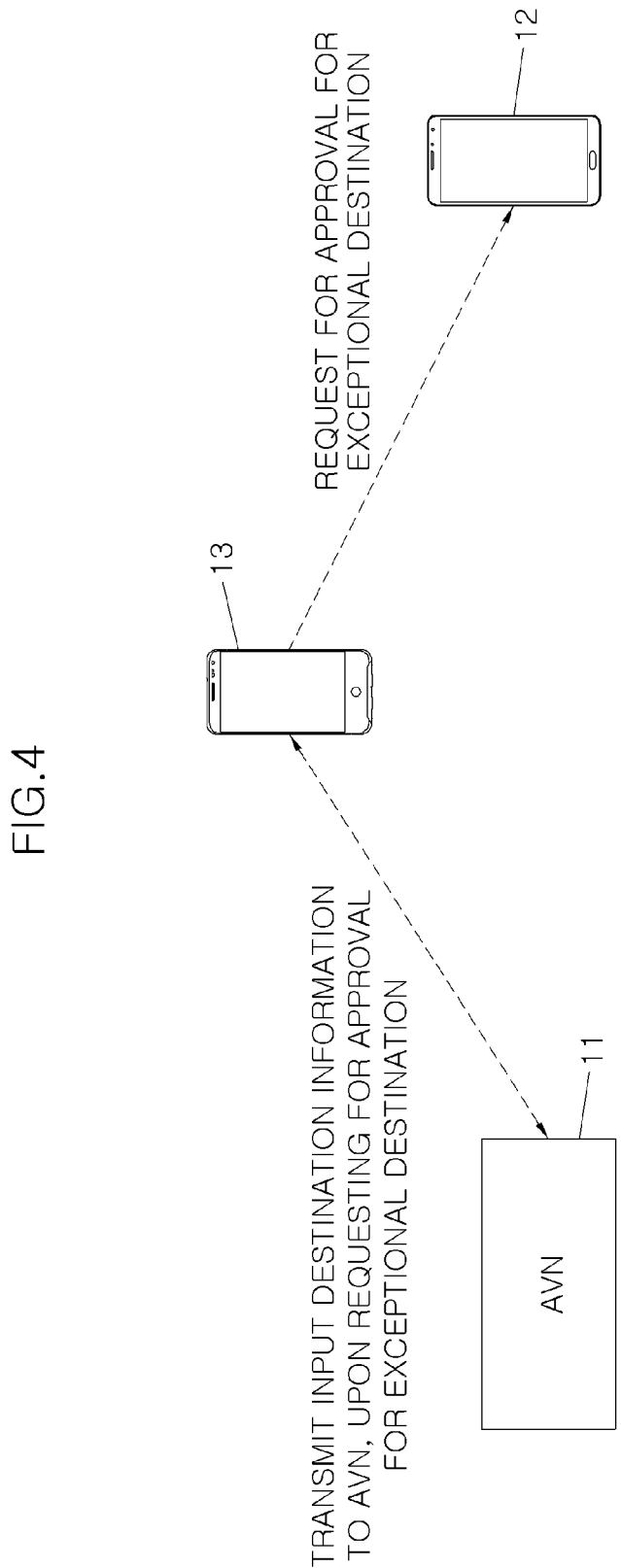
FIG. 4 is a schematic diagram illustrating a procedure in which the AVN requests an approval for the exceptional destination from the master device through a slave device in the system and method for managing the exceptional destination in the geo-fence in accordance with embodiments of the present disclosure.

Since the geo-fence G is a virtual geographical area as illustrated in FIG. 2, it is determined whether or not the destination B is located inside or outside the geo-fence G.

Meanwhile, in the determining the destination position S120, when it is determined that the destination B input by the user is outside the geo-fence G, it asks the user whether or not to approve the destination as the exceptional destination, and the requesting the approval for the exceptional destination S130, which is responded as the request for the approval from the user, is preferably performed.

The requesting for the approval for the exceptional destination S130 is performed when it is determined that the destination B is outside the geo-fence G in the determining the destination position S120.

The exceptional destination can be defined as a destination that does not alarm even if the vehicle leaves the geo-fence G for traveling to the destination B.

The requesting the approval for the exceptional destination S130 requests for approving the destination B input by the user as the exceptional destination. The terminal directly requests the master device 12 to approve the exceptional destination or requests the master device 12 to approve the exceptional destination through the telematics server 14 for telematics service.

The case where the terminal mounted in the vehicle, for example, the AVN 11 supports the telematics service will be described first. When the AVN 11 requests the telematics server 14 to approve the exceptional destination, the telematics server 14 transmits it to the master device 12. In this time, the additional information such as the current position of the vehicle, the route to the destination, and the expected arrival time are delivered to the telematics server 14 from the AVN 11 in addition to the destination input by the user, and the telematics server 14 transmits them to the master device 12. The additional information can already share data with the AVN in the telematics server 14 before receiving it from the AVN. In addition, the telematics server 14 can provide additional information that cannot be confirmed by the AVN to the master device 12, thus further supporting to determine whether or not to be approved in the master device. The additional information can include real-time status information of the destination that can be confirmed only by the telematics server, status information that can occur while guiding the driver along a route to the destination, and history information on the determination of the exceptional destination of the geo-fence.

For this purpose, all the information transmitted to the master device and whether or not to be approved in the master device are finally stored in the telematics server as a database of the geo-fence approval history, the accumulated geo-fence history information is continuously stored and learned in the telematics server, and then, the telematics server can ultimately replace the role of the master device. The information learned in the telematics server can be information for helping the master device to determine whether or not to approve again. In order to replace the telematics server, the slave device, which will be described later, can be similarly applied.

When the AVN 11 mounted in the vehicle does not support the telematics service and cannot communicate with other terminals located remotely through the communication network of the mobile carriers, it requests the master device 12 to approve the exceptional destination through the slave device 13. The slave device can be a passenger in the vehicle including the user and can be carried by a third party outside the vehicle.

When the AVN 11 does not support the telematics service, the AVN 11 cannot access the telematics server 14 through the communication network of the mobile carriers, such that it accesses the master device 12 remotely located through the slave device 13 located adjacent to the AVN 11 to request the approval for the exceptional destination. The AVN 11 and the slave device 13 can perform the near-field communicate with each other through Bluetooth, Wi-Fi, or USB.

In this time, the additional information such as the current position of the vehicle, the route to the destination, and the expected arrival time is also delivered in addition to the destination input by the user.

The receiving the request for the exceptional destination S140 receives the request for the exceptional destination transmitted from the AVN 11 by the master device 12.

Figure 5:
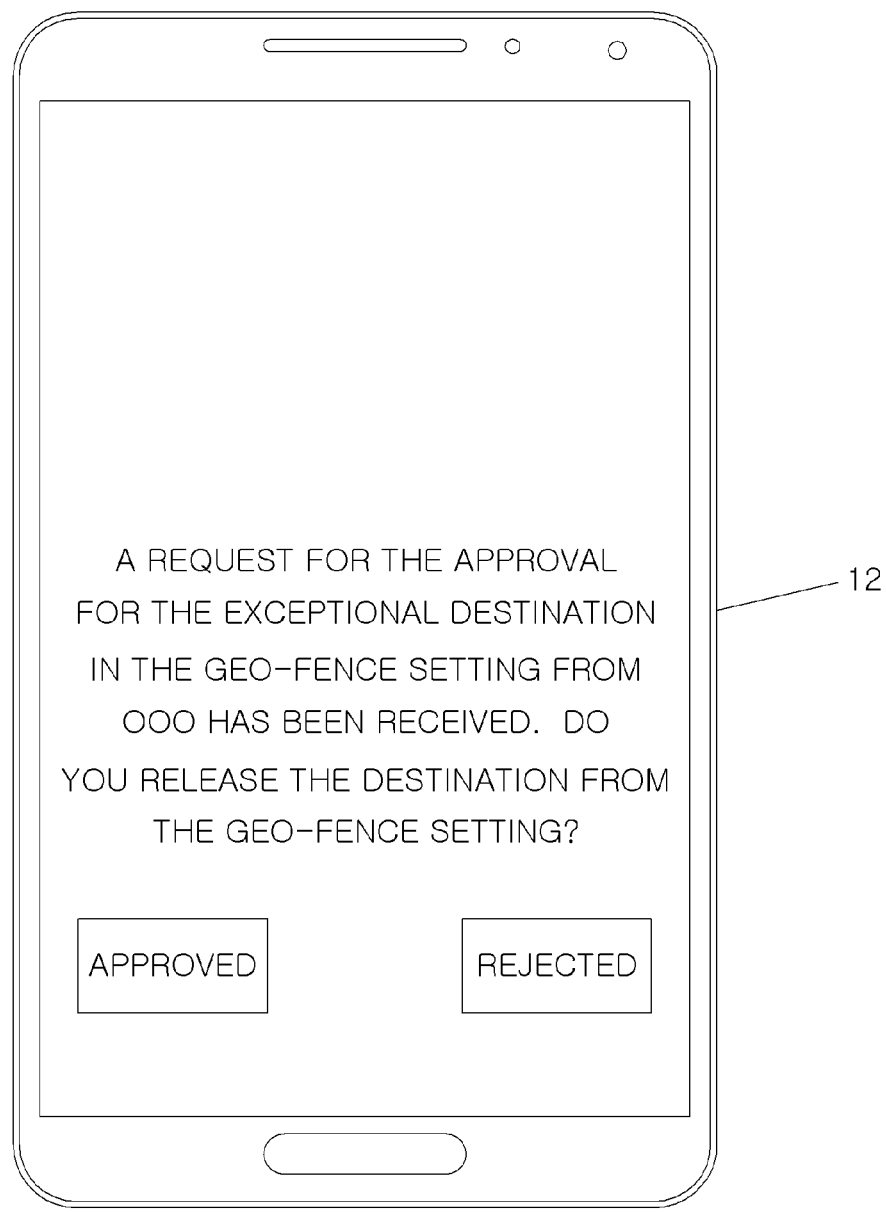
FIG. 5 is a screen illustrating the state where the approval for the exceptional destination has been requested from the master device in the system and method for managing the exceptional destination in the geo-fence in accordance with embodiments of the present disclosure.
Figure 6:
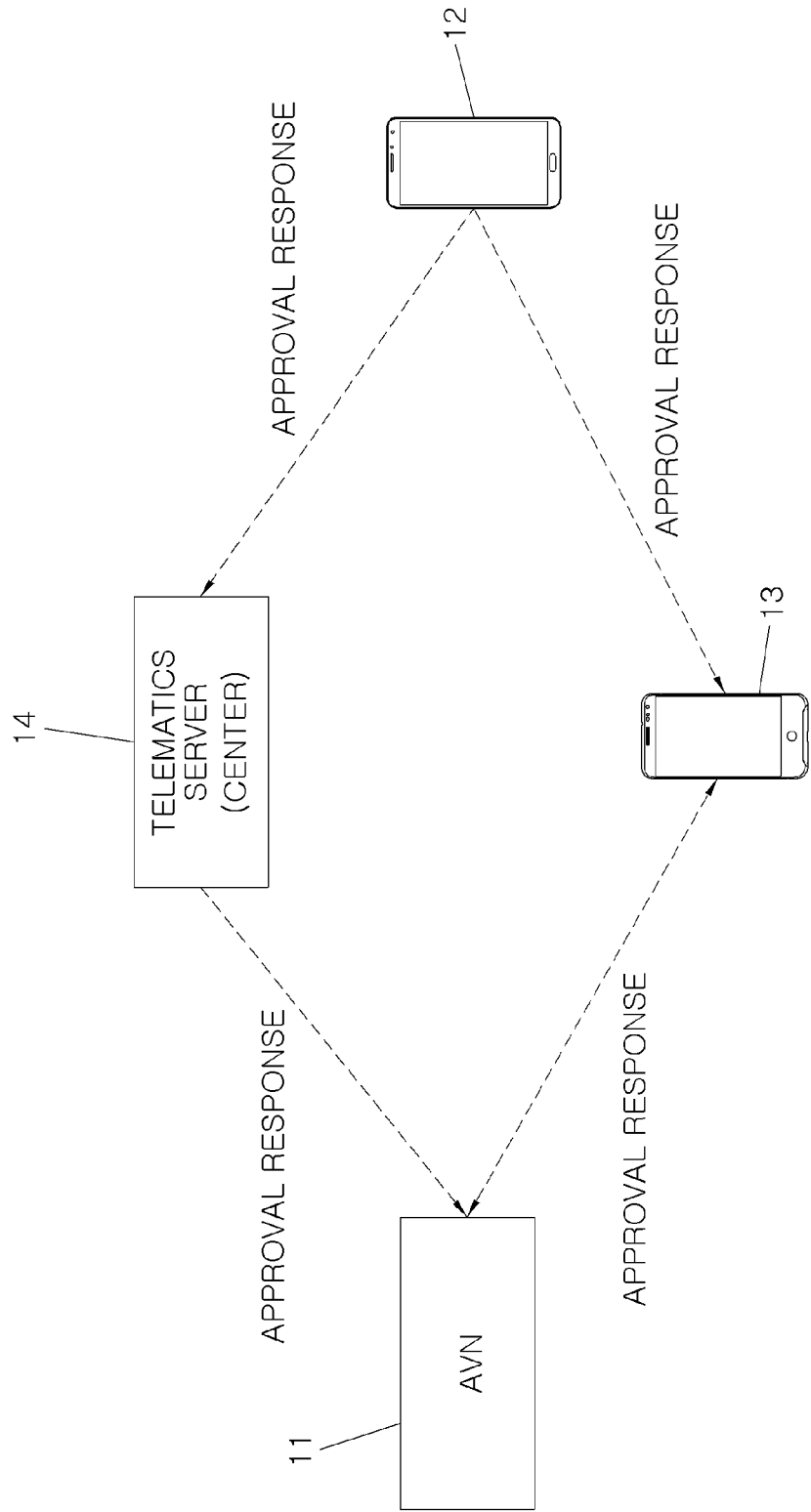
FIG. 6 is a schematic diagram illustrating the state where the master device responses that the exceptional destination has been approved through the telematics server or the slave device in the system and method for managing the exceptional destination in the geo-fence in accordance with embodiments of the present disclosure.

The receiving the request for the exceptional destination S140 can alarm that the request for the exceptional destination has been received through the screen of the master device 12. For example, as illustrated in FIG. 5, the content of the approval request can be displayed on the screen of the master device 12. When the master device 12 is a smart phone, a pop-up message of the application installed in the master device 12 can be displayed thereon, or a text message can be displayed thereon.

The approving the exceptional destination S150 determines whether or not the authorized person who sets the geo-fence approves the destination B input by the user as the exceptional destination.

In the approving the exceptional destination S150, the authorized person who sets the geo-fence or the master device 120 determines whether or not the destination B is suitable for the exceptional destination, or approves the destination B requested by a program stored in the mater device 12 as the exceptional destination.

When the authorized person who sets the geo-fence determines that the requested destination B is valid as the exceptional destination, he/she sends the acknowledgment for the approval to the terminal using the master device 12. The master device 12 sends it back to the AVN 11 through an application or a text message. That is, the approval result is sent back by using the pop-up message of the application or the text message.

In this time, when the AVN 11 can perform the telematics service, the AVN 11 receives the acknowledgement that the exceptional destination has been approved from the master device 12 through the telematics server 14. When the AVN 11 can directly communicate with the master device 12, the AVN 11 receives the acknowledgment that the exceptional destination has been approved directly from the master device 12. When the AVN 11 cannot perform the telematics service or cannot directly communicate with the master device 12, the slave device 13 receives the approval from the master device 12, and transmits it back to the AVN 11.

Even when the authorized person who sets the geo-fence does not approve (i.e., denies) the destination B as the exceptional destination, it sends back in the same manner as described above. However, the procedure after the AVN 11 receives the reject message differs from the procedure upon approval.

In the traveling the exceptional destination S170, when the destination B is approved as the exceptional destination, the AVN 11 guides the vehicle to the destination B, and does not alarm that the vehicle has left the geo-fence G while the vehicle travels from the geo-fence G to the exceptional destination or travels from the exceptional destination into the geo-fence G.

Accordingly, although the destination B is located outside the geo-fence G, the terminal does not alarm that the vehicle has left the geo-fence through the terminal, that is, the screen or the speaker of the AVN 11, such that unnecessary alarm is removed to eliminate discomfort.

Inputting an exception condition S160 can be performed when the destination is approved as the exceptional destination between the approving the exceptional destination S150 and the traveling the exceptional destination S170.

The inputting the exceptional condition S160 inputs an approval condition in which the vehicle can travel to the destination B outside the geo-fence G. The master device 12 can approve the exceptional destination, and then additionally input a time condition or a return condition in which the vehicle can travel to the exceptional destination.

For example, the inputting the exception condition S160 can approve so that the vehicle can travel to the exceptional destination outside the geo-fence by a predetermined number of times. When the traveling to the exceptional destination is required only with a one-time approval, it can be allowed to be approved each time, or to travel to the exceptional destination by a certain number of times.

In addition, the inputting the exception condition S160 can set so that the destination B becomes the exceptional destination until the approval for the exceptional destination is reversed. In this case, it does not perform a departure alarm eve if the destination B is outside the geo-fence G without a separate approval procedure until the approval for the exceptional destination is reversed.

Then, the inputting the exception condition S160 can input so that the destination B becomes the exceptional destination only for a predetermined duration of time. For example, the exceptional destination can be set from the moment leaving the geo-fence to the expected arrival time to the exceptional destination. Alternatively, the exceptional destination can be valid for a predetermined duration of time from the exceptional destination into the geo-fence G.

Meanwhile, after the traveling the exceptional destination S170 is performed, the master device 12 monitors whether or not the vehicle legitimately travels to the exceptional destination, and otherwise, the managing the exceptional destination S180 for alarming that the vehicle is outside the geo-fence G can be performed again according to a predetermined condition.

The managing the exceptional destination S180 monitors whether or not the vehicle legitimately travels to the destination B that has been approved as the exceptional destination. The vehicle does not alarm the departure of the geo-fence even if it leaves the geo-fence G under the condition traveling to the destination B. However, despite the approval for the departure of the geo-fence for the vehicle to travel to the destination B, when it is determined that the vehicle does not travel to the destination B or does not enter the geo-fence G from the destination B, it is necessary to alarm that the vehicle has left the geo-fence G.

Accordingly, in the managing the exceptional destination S180, when it is determined that the vehicle approved to travel to the destination B approved as the exceptional destination does not travel to the exceptional destination, or does not re-enter from the destination B to the geo-fence G, it is alarmed that the vehicle has left the geo-fence G through the terminal.

In the managing the exceptional destination S180, the master device 12 can alarm the departure of the geo-fence G again when the vehicle is outside the geo-fence G and the designation of destination B as an exceptional destination is reversed.

In addition, in the managing the exceptional destination S180, when the master device 12 does not re-enter the geo-fence G within a predetermined duration of time after the vehicle has left the geo-fence G, it can alarm the departure of the geo-fence G again.

Operating a normal geo-fence S190 is performed when the destination B is located in the geo-fence G in the determining the destination position S120, or the master device 12 does not approve (i.e., denies) the destination B as the exceptional destination in the approving the exceptional destination S150.

The operating the normal geo-fence S190 confirms the position of the vehicle in real-time, and when the vehicle leaves the geo-fence G, alarms that the vehicle has left the geo-fence G from the moment. That is, the operating the normal geo-fence S190 alarms that the vehicle has left the geo-fence G through the terminal located in the vehicle, for example, the screen or the speaker of the AVN 11 or the slave device 13 when the vehicle leaves the geo-fence G.

In addition, the master device 12 also alarms so that the authorized person who sets the geo-fence can recognize that the vehicle has left the geo-fence G.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for managing a geo-fence of a vehicle, the system comprising:
    a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination; a master device operated by a person authorized to set the geo-fence, the master device configured to receive the request and to generate the approval for designating the destination as an exceptional destination in response to the request; and
    a telematics server, wherein the telematics server is configured to store the request and the approval for designating the destination as an exceptional destination.

2. The system of claim 1, wherein the terminal is configured to communicate with the master device through the telematics server.

3. The system of claim 2,
    wherein the telematics server is configured to deliver the request from the terminal to the master device.

4. The system of claim 1,
    wherein the terminal is configured to communicate with the master device through a slave device.

5. The system of claim 2, wherein the terminal is configured to generate the alarm indicating that the vehicle has left the geo-fence when the vehicle leaves the geo-fence, and guidance along a route to the destination is deactivated.

6. A system for managing a geo-fence of a vehicle, the system comprising:
    a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination; and a master device operated by a person authorized to set the geo-fence, the master device configured to receive the request and to generate the approval for designating the destination as an exceptional destination in response to the request,
    wherein, when the designation of the destination is approved, the vehicle is permitted to travel to the destination a predetermined number of times.

7. The system of claim 2, wherein, when the designation of the destination is approved, the vehicle is permitted to travel to the exceptional destination outside the geo-fence for a predetermined duration of time.

8. A system for managing a geo-fence of a vehicle, the system comprising:
    a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination; and a master device operated by a person authorized to set the geo-fence, the master device configured to receive the request and to generate the approval for designating the destination as an exceptional destination in response to the request, wherein, when the designation of the destination is approved, the vehicle is permitted to travel to the destination until the designation of the destination as an exceptional destination is reversed.

9. A system for managing a geo-fence of a vehicle, the system comprising:

a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination; and a master device operated by a person authorized to set the geo-fence, the master device configured to receive the request and to generate the approval for designating the destination as an exceptional destination in response to the request, wherein the terminal is an audio-video-navigation (AVN) device that is equipped in the vehicle, and the terminal is configured to determine whether the input destination is located outside of the geo-fence when the destination is input to the AVN device, and to request the approval for designating the destination as an exceptional destination from the master device when the destination is located outside of the geo-fence.

10. A system for managing a geo-fence of a vehicle, the system comprising:

a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination; and a master device operated by a person authorized to set the geo-fence, the master device configured to receive the request and to generate the approval for designating the destination as an exceptional destination in response to the request, wherein the terminal is configured to communicate with the master device through a slave device, and wherein the terminal is an AVN device that is equipped in the vehicle, and the terminal is configured to determine whether the input destination is located outside of the geo-fence when the destination is input to the AVN device, and the to request the approval wherein when the AVN determines that the destination is located outside the geo-fence from the master device through the slave device when the destination is located outside of the geo-fence.

11. A system for managing a geo-fence of a vehicle, the system comprising:

a terminal equipped in the vehicle, the terminal configured to determine whether a current position of the vehicle or an input destination is located outside of a previously established geo-fence stored in the terminal, the geo-fence defining an area in which traveling of the vehicle is approved, to generate an alarm indicating that the vehicle has left the geo-fence when the vehicle leaves the geo-fence, to request approval for designating a destination outside of the geo-fence as an exceptional destination, and when the designation of the destination is approved, to prevent the generation of the alarm when the vehicle leaves the geo-fence while traveling to the destination, wherein the terminal is configured to generate the alarm indicating that the vehicle has left the geo-fence when the vehicle has left the geo-fence and not returned to a location inside of the geo-fence within a predetermined time.

12. A method for managing a geo-fence of a vehicle, the method comprising:

receiving, by a terminal equipped in the vehicle, a destination to which a user intends to travel;

determining, by the terminal, whether the destination is located outside of a previously established geo-fence stored in the terminal, the geo-fence defining an area in which traveling of the vehicle is approved;

generating, by the terminal, an alarm indicating that the vehicle has left the geo-fence when the vehicle leaves the geo-fence;

requesting, by the terminal, approval for designating a destination outside of the geo-fence as an exceptional destination from a master device operated by a person authorized to set the geo-fence;

receiving, by the master device, the request from the terminal;

generating, by the master device, the approval for designating the destination as an exceptional destination in response to the request;

preventing, by the terminal, the generation of the alarm when the vehicle leaves the geo-fence while traveling to the destination;

generating, by the master device, the approval for designating the destination as an exceptional destination and a condition under which the designation is approved; and transmitting, by the master device, an indication of the approval for designating the destination as an exceptional destination and the condition under which the designation is approved to the terminal, wherein the condition under which the designation is approved permits the vehicle to travel to the destination a predetermined number of times.

13. The method of claim 12, further comprising requesting, by the terminal, the approval for designating the destination as an exceptional destination directly from the master device; and transmitting, by the master device, the approval for designating the destination as an exceptional destination directly to the terminal.

14. The method of claim 12, further comprising
- requesting, by the terminal, the approval for designating the destination as an exceptional destination through a slave device belonging to a user that is aboard the vehicle; and
- transmitting, by the master device, the approval for designating the destination as an exceptional destination through the slave device.

15. The method of claim 12, further comprising
- requesting, by the terminal, the approval for designating the destination as an exceptional destination through a telematics server; and
- transmitting, by the master device, the approval for designating the destination as an exceptional destination through the telematics server.

16. The method of claim 12, further comprising
- transmitting, by the terminal, the destination, a current position of the vehicle, a route to the destination, and an expected arrival time to the master device.

17. A method for managing a geo-fence of a vehicle, the method comprising:
- receiving, by a terminal equipped in the vehicle, a destination to which a user intends to travel;
- determining, by the terminal, whether the destination is located outside of a previously established geo-fence stored in the terminal, the geo-fence defining an area in which traveling of the vehicle is approved;
- generating, by the terminal, an alarm indicating that the vehicle has left the geo-fence when the vehicle leaves the geo-fence;
- requesting, by the terminal, approval for designating a destination outside of the geo-fence as an exceptional destination from a master device operated by a person authorized to set the geo-fence;
- receiving, by the master device, the request from the terminal;
- generating, by the master device, the approval for designating the destination as an exceptional destination in response to the request;
- preventing, by the terminal, the generation of the alarm when the vehicle leaves the geo-fence while traveling to the destination;
- generating, by the master device, the approval for designating the destination as an exceptional destination and a condition under which the designation is approved; and
- transmitting, by the master device, an indication of the approval for designating the destination as an exceptional destination and the condition under which the designation is approved to the terminal,
- wherein the condition under which the designation is approved permits the vehicle to travel to the destination until the designation of the destination as an exceptional destination is reversed.

18. The method of claim 17,
- wherein the condition under which the designation is approved permits the vehicle to travel to the destination for a predetermined duration of time.

19. The method of claim 12, further comprising
- monitoring, by the master device, whether the vehicle is traveling to the destination;
- reversing, by the master device, the designation of the destination as an exceptional destination when the vehicle is not traveling to the destination; and
- when the designation of the destination as an exceptional destination has been reversed, generating, by the terminal, the alarm indicating that the vehicle has left the geo-fence when the vehicle leaves the geo-fence.

20. The method of claim 12, further comprising
- generating, by the terminal, the alarm indicating that the vehicle has left the geo-fence when the vehicle leaves the geo-fence, and guidance along a route to the destination is deactivated.

21. A method for managing a geo-fence of a vehicle, the method comprising:
- receiving, by a terminal equipped in the vehicle, a destination to which a user intends to travel;
- determining, by the terminal, whether the destination is located outside of a previously established geo-fence stored in the terminal, the geo-fence defining an area in which traveling of the vehicle is approved;
- generating, by the terminal, an alarm indicating that the vehicle has left the geo-fence when the vehicle leaves the geo-fence;
- requesting, by the terminal, approval for designating a destination outside of the geo-fence as an exceptional destination from a master device operated by a person authorized to set the geo-fence;
- receiving, by the master device, the request from the terminal;
- generating, by the master device, the approval for designating the destination as an exceptional destination in response to the request;
- preventing, by the terminal, the generation of the alarm when the vehicle leaves the geo-fence while traveling to the destination; and
- generating, by the terminal, the alarm indicating that the vehicle has left the geo-fence when the vehicle has left the geo-fence and not returned to a location inside of the geo-fence within a predetermined time.

22. The method of claim 12, further comprising
- when the designation of the destination as an exceptional destination is denied, generating, by the terminal, the alarm indicating that the vehicle has left the geo-fence when the vehicle leaves the geo-fence.

23. The method of claim 12,
- when the destination is located inside of the geo-fence, generating, by the terminal, the alarm indicating that the vehicle has left the geo-fence when the vehicle leaves the geo-fence.

24. The method of claim 15,
- delivering, by the telematics server, the request from the terminal to the master device.

25. The method of claim 24,
- storing, by the telematics terminal, the request and the approval for designating the destination as an exceptional destination.

* * * * *